C. R. RANEY & R. C. LIVESAY.
GRAIN SHOCKING MACHINE.
APPLICATION FILED JAN. 6, 1913.
1,219,150.
Patented Mar. 13, 1917.
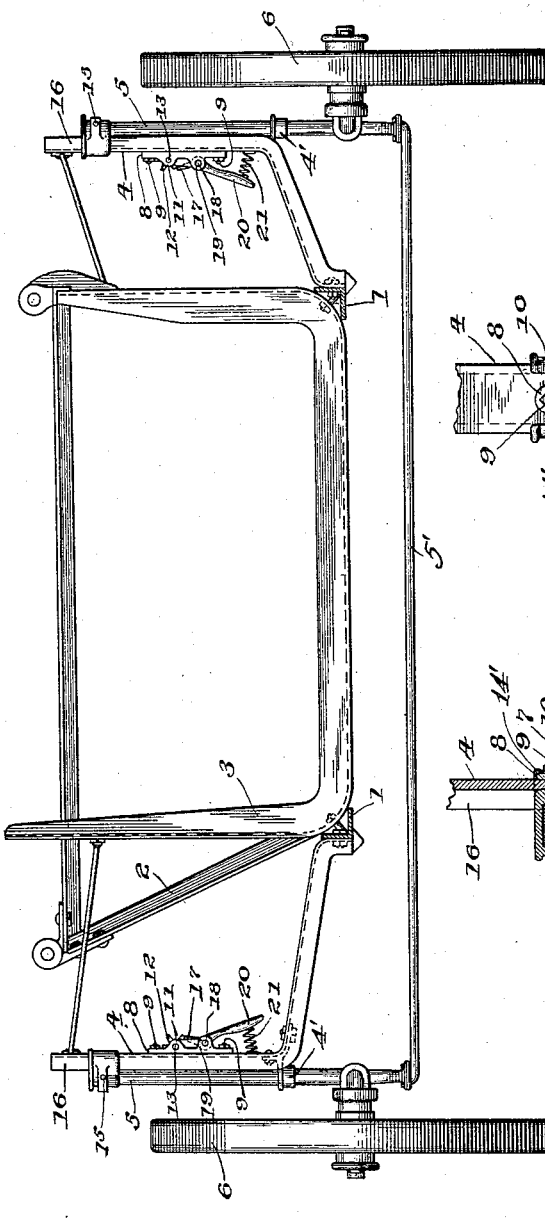
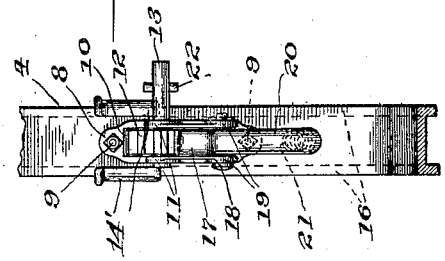
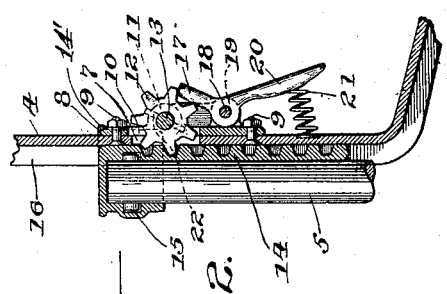
Witnesses:
C. C. Palmer.
F. W. Hoffmister.
Inventors.
Clemma R. Raney
and
Robert C. Livesay,
By Chas. E. Lord
Attorney.

UNITED STATES PATENT OFFICE.

CLEMMA R. RANEY, OF CHICAGO, AND ROBERT C. LIVESAY, OF MOLINE, ILLINOIS, ASSIGNORS TO INTERNATIONAL HARVESTER COMPANY OF NEW JERSEY, A CORPORATION OF NEW JERSEY.

GRAIN-SHOCKING MACHINE.

1,219,150.  Specification of Letters Patent.  Patented Mar. 13, 1917.

Application filed January 6, 1913. Serial No. 740,484.

*To all whom it may concern:*

Be it known that we, CLEMMA R. RANEY and ROBERT C. LIVESAY, citizens of the United States, residing at Chicago and Moline, respectively, in the county of Cook and the county of Rock Island, respectively, and State of Illinois, have invented certain new and useful Improvements in Grain-Shocking Machines, of which the following is a full, clear, and exact specification.

Our invention relates to grain shocking machines.

In grain shockers of the swinging fork type wherein the sheaves delivered to the cradle by the fork are bound in the shocker cradle while in prostrate position and the cradle is then raised to vertical position to discharge the bound shock, it has been found that under certain grain conditions the fork delivers sheaves to the cradle with their butts protruding too far through the vertical end tines thereof. This has resulted in deleteriously affecting the standing quality of the shock as when the cradle is dumped the ends of these sheaves are crumpled against the ground as the cradle moves to shock discharging position in such a manner as to cause the shock to fall or tilt toward the shocker as the latter moves forward. In certain other conditions where the grain is short, difficulty has also been experienced in setting shocks formed of short sheaves, due to the fact that with the cradle set for long grain the sheaves have too great a range of movement prior to the time they strike the ground.

Our invention has for its object to adjust the shocker truck vertically in an improved manner whereby this tendency toward variation in the standing qualities of shocks of long or short grain is effectually prevented. A more specific object of our invention is to adjust the frame and running gear of a shocker relatively to each other in an improved manner so that the height of the shocker frame and the device or devices carried thereon may be readily changed as desired. We attain this object by providing improved positively acting means operatively connected between the shocker frame and the running gear which are readily adjustable to move the frame to any one of a plurality of positions and automatically lock the parts in any desired position.

In order to clearly and fully disclose our invention we have illustrated one embodiment of the same in the accompanying drawings, wherein the same is shown used in connection with a grain shocker frame of the type described and claimed in our co-pending application Serial No. 740,481, filed Jan. 6, 1913. It is to be understood, however, that our invention is not limited to the embodiment shown herein, but may be modified without departing from its spirit.

Figure 1 is a rear elevation of the frame.

Fig. 2 is a sectional view of the adjusting means therefor;

Fig. 3 is an elevation of the means shown in Fig. 2.

The frame shown includes a horizontally disposed U-shaped member 1 adapted to support grain shocking or other mechanism; vertically disposed U-shaped members 2 and 3 carried thereby and rigidly attached thereto, and a pair of vertically extending parallel arms or standards 4 of channel construction rigidly attached to the opposite sides of the member 1 and themselves adjustably and slidably attached, as hereinafter described, to coöperating rotatable wheel standards 5 connected together by a rigid link 5', forming a part of the running gear and provided at their lower ends with transport wheels 6.

The standards 4 are each provided with a longitudinally extending opening or slot 7 near their ends, and carry a slotted plate 8 fixed thereto, as by bolts 9, so that the slot 10 therein is substantially over the slot or opening 7 in the standards 4. On opposite sides of this slot the plate 8 is provided with lugs 11 in which a pinion 12, is rotatably mounted on a shaft or spindle 13. As shown, the teeth of this pinion protrude through both the openings 7 and 10, respectively, and engage with a rack member 14 carried upon the end of the standard 5 and swiveled thereto, as at 15, so that the standard 5 is free to turn thereon but may not be moved longitudinally thereof. As shown in Fig. 2, this rack member is received between the overturned edges or flanges 16 of the standard 4, and the latter is reciprocable thereon upon movement of the pinion 12, the frame standard being held in the desired relation to the wheel standard 5 by lips 14' on the upper end of the rack member 14 and by a collar 4' carried by the frame and slidable on the lower portion of the wheel standard 5. In order to automatically lock the pinion in any desired position, we provide an underlying dog or pawl 17 pivoted on a spindle 18 journaled in lugs 19 formed on the plate 8. The pinion-engaging end of this dog is elongated and substantially rectangular in shape so that in locking position it forms a substantial abutment under the second tooth of the pinion above the pivot point of the dog and at the right of the same. In order that the dog may be manually operated to release the pinion, an elongated shank or handle 20 is provided upon the same. Further, in order that the dog may be automatically thrown into engagement with the pinion, a coiled spring 21 is positioned between this handle and the standard 4 at a point beneath the pivot point of the dog. Further, in order that the pinion 12 may be readily operated, its spindle 13 is preferably protruded at one side and provided with one or more lugs 22, so that the same may be rotated by a suitable key or crank.

The operation of the construction shown is as follows: When it is desired to raise the frame, as, for instance, when it is found that the butts of the sheaves protrude too great a distance through the end tines of the cradle, it is only necessary to attach a suitable crank or key to the end of the desired spindle 13 and rotate the same so that the pinion 12 travels upon the rack 14. Due to the action of the spring 21, the pawl 17 automatically locks the pinion in each position. Obviously, when it is desired to lower the frame, it is only necessary to press in the handle 20 of the pawl to throw the latter out of engagement with the pinion, whereupon the frame is readily movable downward to the desired position. When this position is reached and pressure upon the handle 20 is removed, the dog 17 automatically returns to locking position.

It is to be noted that in the construction shown, the frame may be readily adjusted either upward or downward with respect to the standards irrespective of the angular displacement of the wheels. Further, in each position the frame is securely locked to the standards due to the action of the pawl which is automatically thrown in by its springs so that it underlies one of the teeth of the pinion and provides a substantial abutment. It is further to be noted that when it is desired to lower the frame, it is only necessary to release the pawl from its engagement with the pinion by a relatively short movement of the pawl handle whereupon the frame is freely movable by gravity to the desired position and is positively and automatically locked in this position upon the release of the pressure upon the handle.

While we have herein specifically described this embodiment of our invention, it is, of course, to be understood that the form shown is susceptible of adaptation to other devices than that shown herein, and may be modified without departing from its spirit.

What we claim, and desire to secure by Letters Patent, is:

1. In a shocking machine, a wheeled member having a rotatable standard thereon, a shocker frame carried thereby and operatively connected to said standard, a rack member carried on one of said members forming a journal for said standard, a pinion carried on the other member coöperating with said rack member to vary the relative position of said members, and means for locking the parts in position.

2. In a shocking machine, a wheeled member having a rotatable standard thereon, a rack member carried by said standard and forming a journal therefor, a shocker frame slidably connected to said standard and rack member, a pinion rotatably mounted on said frame and having teeth engaging said rack member, and means normally locking said pinion in engagement with said rack member.

3. In a shocking machine, a truck standard, a rack member thereon, a slotted frame member slidably mounted on said standard, a pinion journaled on said frame member and extending through the slot therein into engagement with said rack, and a pawl pivotally mounted on said frame member beneath said pinion disposed in supporting engagement beneath one of the teeth thereof.

4. In a shocking machine, a truck having rotatable wheel standards on opposite sides of the same, rack members in which said standards are swiveled, a frame vertically adjustable with respect to said standards, and means carried on said frame and coöperating with said rack members for varying the elevation of said frame and locking the same in each position of adjustment thereof.

5. In a shocking machine, a plurality of rotatable wheel standards, rack members to which said standards are swivelingly connected, a frame slidable relative to said standards and rack members, and means carried on said frame and coöperating with said rack members whereby said frame may be raised and lowered with respect to said standards and secured in each position of adjustment.

6. In a shocking machine, a frame, a plurality of wheel standards rotatably mounted with relation thereto and having a sliding connection therewith, rack members carried on one of said elements, pinions carried on the other of said elements engageable with said rack members, means whereby said pinions may be rotated to vary the elevation of said frame with respect to said standards, and means for holding said pinions in each position of adjustment.

7. In a shocking machine, a wheeled truck having a standard, a rack carried by said standard, a shocker frame having an arm slidably connected to said standard and provided with a slot opposite said rack, a plate fixed to said frame having a slot registering with the slot in said frame, a pinion rotatably mounted on said plate having its teeth protruding through said slots into engagement with said rack, a pawl pivoted to said plate beneath said pinion, and a spring normally holding said pawl in supporting engagement with one of the teeth of said pinion.

8. In a shocking machine, a plurality of spaced wheel members, rack members carried thereon, connections between said rack members and wheels whereby the latter may rotate freely, a shocker frame disposed between said rack members, coöperating rack-engaging members carried on each side of said frame, and means whereby one side of said frame may be adjusted independently of the other and relative to its rack member to maintain said frame substantially horizontal when passing over uneven ground.

9. In a shocking machine, a truck having upstanding arms thereon, racks carried on said arms, a frame having vertically disposed arms slidably connected to the arms on said truck and having slots therein movable longitudinally of said rack members, pinions journaled on said frame arms and extending through said slots into engagement with said racks, means whereby said pinions may be rotated to adjust said frame vertically relative to said arms in one direction, and independently operated pawls controlling said pinions whereby upon release of one of the same one side of said frame may drop downward with respect to the other side.

10. In a shocking machine, a wheeled truck having a plurality of vertically extending standards on opposite sides of the same, racks carried by said standards, a shocker frame having vertically extending arms provided with slots opposite said racks, plates fixed to said frame having slots registering with the slots in said frame, pinions rotatably mounted on said plates having their teeth protruding through said slots into engagement with said racks, pawls pivoted to said plates beneath said pinions and disposed in supporting engagement beneath certain of the teeth thereof, said pawls being provided with elongated handles, and coiled springs carried between said handles and said frame normally holding said pawls in engagement with said pinions.

In testimony whereof we affix our signatures, in the presence of two witnesses.

CLEMMA R. RANEY.
ROBERT C. LIVESAY.

Witnesses for Raney:
 RAY PATTISON,
 FRANK V. ZABILKA.
Witnesses for Livesay:
 E. H. HEMMINGSON,
 T. E. VAN METER.

Copies of this patent may be obtained for five cents each, by addressing the "Commissioner of Patents, Washington, D. C."